March 4, 1941.    L. J. DELLERT    2,234,025
VEHICLE AND CENTRALIZING DEVICE THEREFOR
Filed March 2, 1938    3 Sheets-Sheet 1

WITNESSES

INVENTOR
Louis J. Dellert
BY
Munn Anderson & Liddy
ATTORNEYS

March 4, 1941.   L. J. DELLERT   2,234,025
VEHICLE AND CENTRALIZING DEVICE THEREFOR
Filed March 2, 1938   3 Sheets-Sheet 2
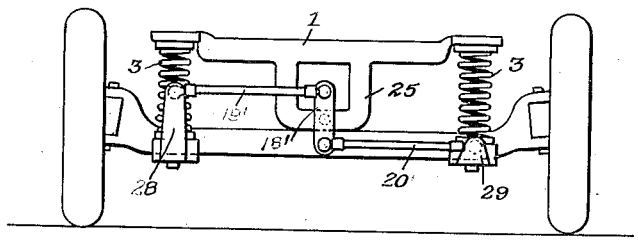
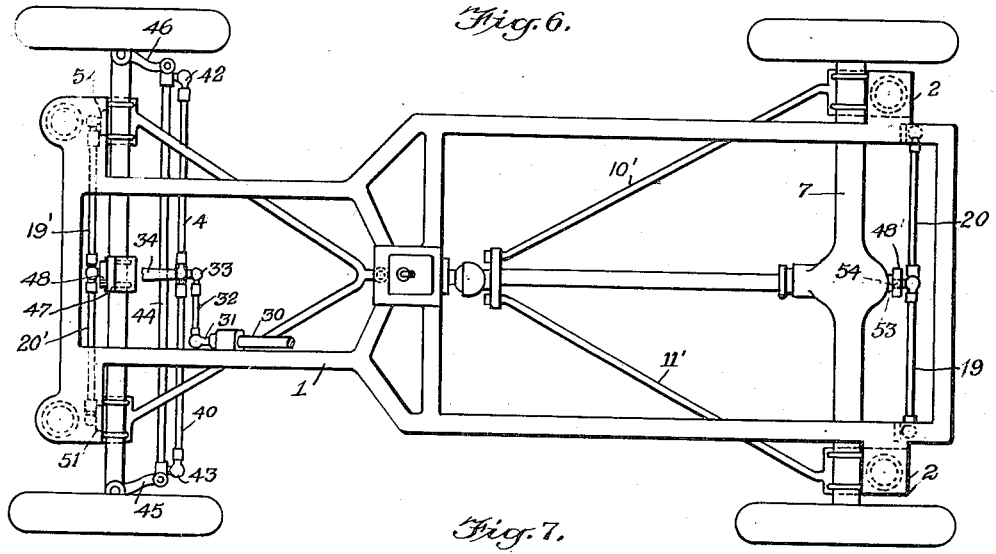
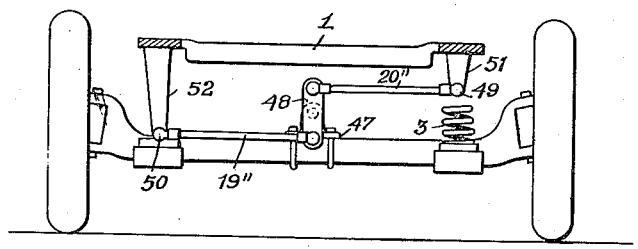
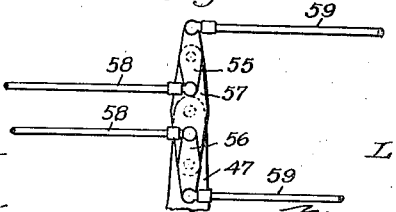
WITNESSES
INVENTOR
Louis J. Dellert
BY
ATTORNEYS March 4, 1941.   L. J. DELLERT   2,234,025
VEHICLE AND CENTRALIZING DEVICE THEREFOR
Filed March 2, 1938   3 Sheets-Sheet 3

WITNESSES

INVENTOR
Louis J. Dellert
BY
Munn Anderson & Liddy
ATTORNEYS

Patented Mar. 4, 1941

2,234,025

UNITED STATES PATENT OFFICE 2,234,025

VEHICLE AND CENTRALIZING DEVICE THEREFOR

Louis J. Dellert, Brooklyn, N. Y.

Application March 2, 1938, Serial No. 193,463

2 Claims. (Cl. 267—66)

The invention relates to vehicles and centralizing devices therefor, an object being to provide an improved wheeled vehicle utilizing springs between the wheel and the body of the vehicle wherein means are provided which will centralize the movement of the body on the springs so as to prevent or reduce to a minimum any forward and rearward movement of the body or lateral movement of the body in respect to the wheels.

Another object of the invention is to provide an automobile with means for utilizing coil springs to support the chassis and body of the car and, at the same time, prevent any appreciable side movement of the chassis independent of the wheels.

An additional object of the invention is to provide a wheeled vehicle, as for instance an automobile, with means for equalizing side strain so as to prevent any appreciable side movement of the chassis independent of the wheels while permitting a free up-and-down movement thereof.

In the accompanying drawings—

Fig. 4 is a front end view of the structure shown in Fig. 1;

Fig. 6 is a view similar to Fig. 1 but showing a slightly modified form of the invention;

Fig. 7 is a front view of the structure shown in Fig. 6;

Fig. 8 is a modified form of the lever and associated parts shown at the center of Fig. 7;

Figure 1:
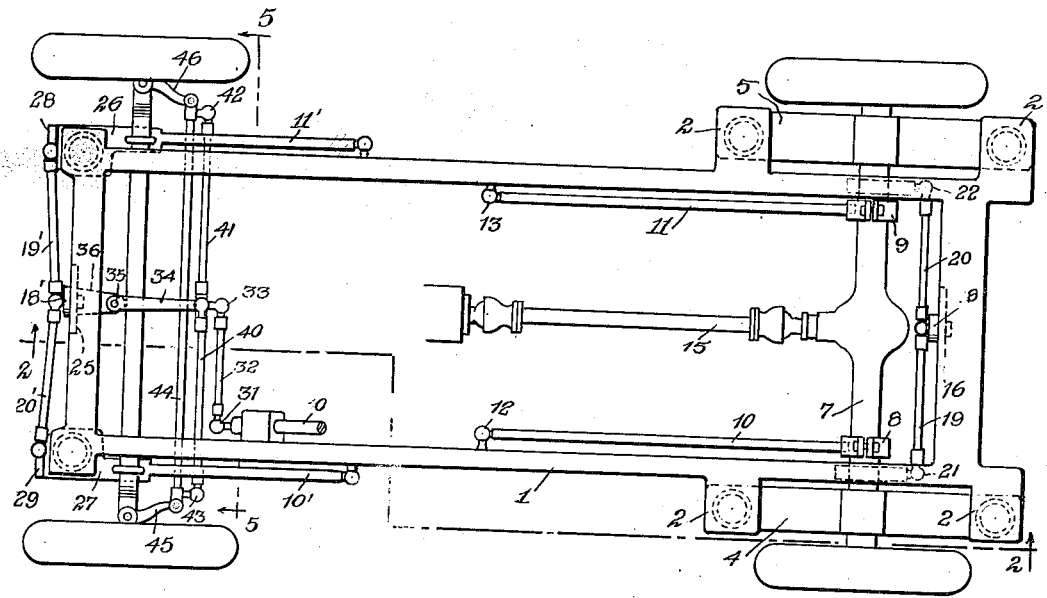
Fig. 1 is a top plan view of an automobile with the body removed and illustrating a special form of chassis and centralizing devices therefor.
Figure 2:
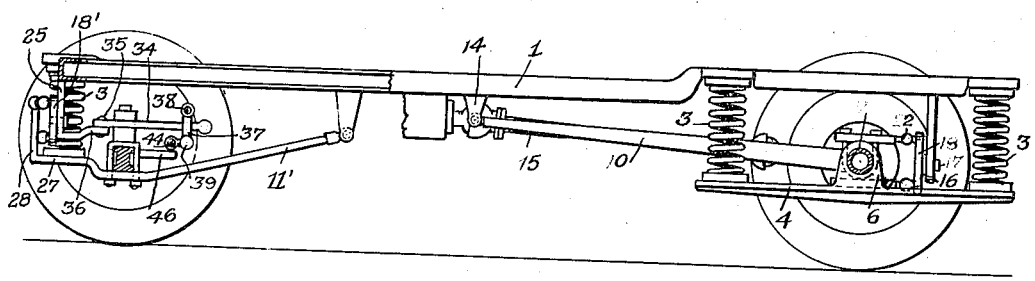
Fig. 2 is a sectional view through Fig. 1 approximately on the line 2—2.

Referring to the accompanying drawings by numerals, 1 indicates a chassis which may be of any desired construction but preferably is formed of channel iron and provided with four laterally extending ears 2 against which the respective springs 3 rest. These springs have been shown as coil springs but could be made of other types without departing from the spirit of the invention. As shown in the drawings, there are two springs on each side of the chassis and these springs are supported by plates 4 and 5 respectively, which plates have extensions for rigidly supporting the same on the axle casing 7. Preferably these extensions surround the axle casing and are welded or otherwise rigidly secured thereto. The invention, as shown in Figs. 1 and 2, is applied to what is known as a "Hotchkiss drive." The bracing structures 10 and 11 prevent any appreciable forward or rearward movement of the axle in relation to the chassis, but permit a limited oscillating movement of the axle and casing 7. The supporting plates 4 and 5 may be made comparatively rigid throughout, or if desired may be made of spring steel sufficiently resilient to absorb axle shocks.

The invention has been shown as applied to a construction using a torque tube drive as illustrated in Fig. 6. In this application of the invention the bracing structures 10' and 11' are preferably rigidly secured to the casing 7 while in the form shown in Fig. 1 they are connected to the casing 7 by clamps 8 and 9 which are rotatably mounted on the casing. It will also be noted that in the form of the invention shown in Fig. 6 the drive shaft casing is rigidly secured to the axle casing so that all these parts move as a unit. However, when the automobile is in use any tendency of side sway of the chassis in relation to the axle casing and wheels is prevented or reduced to a minimum by centralizing structures hereinafter fully described.

The braces 10 and 11, as above described, prevent any appreciable forward or rearward movement of the chassis but do not prevent any lateral movement. To prevent or reduce to a minimum the lateral movement of the chassis there is provided at the rear of the chassis a U-shaped member which may be welded or otherwise rigidly secured to the chassis and which supports a pivotal pin 17 carrying an equalizing bar 18 arranged in a substantially vertical position. Equalizing rods 19 and 20 are connected to the respective ends of bar 18 by suitable ball-and-socket joints. At the outer ends the respective rods 19 and 20 are connected by suitable ball-and-socket joints 21 and 22 to the respective U-bolts 23 and 24 which rigidly clamp the axle casing 7.

Figure 3:
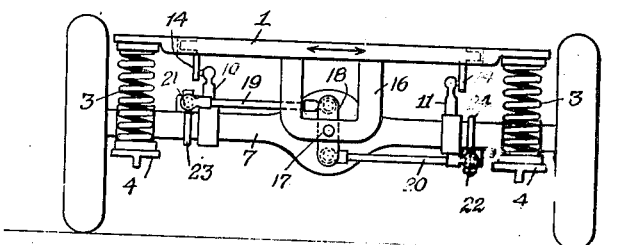
Fig. 3 is a rear end view of the structure shown in Fig. 1.

In case it is desired to move the chassis upwardly and downwardly such movement is permitted within the limits of the respective springs 3. During the direct upward and downward movement of the chassis, the various ball-and-socket joints just mentioned will permit a slight swinging movement of the rods 19 and 20 and also a slight rotary movement of equalizing bar 18. For instance, if the chassis should move down a considerable distance the upper end of bar 18 would swing to the left, as shown in Fig. 3, and the lower end would swing to the right so as to compensate for the distance between the respective parts. However, if the chassis should attempt to move to the right as shown in Fig. 3, this would cause the chassis to tend to move pin 17 to the right. The rods 19 and 20 would resist this movement and, in fact, hold the chassis against any appreciable movement as just mentioned. It will be noted that if the pin 17 were given a tendency to move to the right, as shown in Fig. 3, it would have a tendency to pull on rod 19 and push on rod 20. These rods being connected to fixed U-bolts 23 and 24 would resist any tendency and, consequently, the movement would not be appreciable though an up-and-down movement might freely take place. During the up-and-down movement the rods 19 and 20 would swing in a slight arc and the bar 18 would compensate by a swinging movement for a change in the distance between certain points. In case the right-hand side of the chassis, as shown in Fig. 3, moved downwardly an appreciable distance such action would be permitted but a side movement would not take place.

The front of the structure shown in Fig. 1 is really of the same construction as the rear though slightly rearranged as indicated in Fig. 4. Referring particularly to this figure it will be seen that there is provided a U-shaped member 25 which is similar to member 16 and this member carries the pivotal bar 18' to which the rods 19' and 20' are pivotally connected by suitable ball-and-socket joints. At this end of the automobile instead of having the U-bolts as described for the rear, the front bracing rods 10' and 11' are provided with enlarged ends 26 and 27 on which the front springs 3 rest. These enlarged ends are also turned up to provide integral upstanding brackets to which the outer ends of the rods 19' and 20' are pivotally connected by suitable ball-and-socket joints. The action at this end of the automobile is the same as at the rear.

Figure 5:
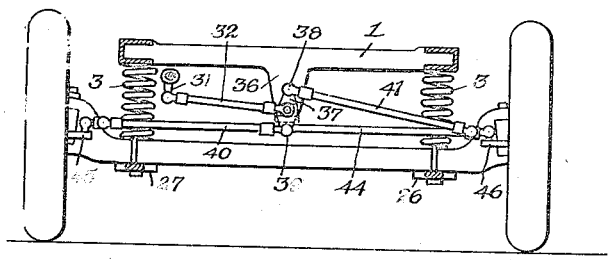
Fig. 5 is a sectional view through Fig. 1 approximately on the line 5—5.

At the end of the automobile, as shown in Figs. 1 and 5 particularly, there is provided a special arrangement of steering mechanism which functions properly notwithstanding the use of the equalizing and centralizing devices just described. Referring to these figures, 30 indicates the steering column which operates a small lever 31 (Fig. 5) which is connected to the transversely extending rod 32 by suitable ball-and-socket connection. The rod 32 at the end located centrally of the automobile is connected by a ball-and-socket connection 33 with the outer end of the automobile lever 34 which is pivotally mounted at 35 on a bracket 36 depending from the chassis 1. The lever 34 is mounted to swing only horizontally and extends through an equalizing plate 37 which is pivotally mounted thereon and arranged with its ends pivotally connected through ball-and-socket joints 38 and 39 to the steering rods 40 and 41 connected through ball-and-socket joints 42 and 43 to the transverse rod 44 near its ends. Rod 44 is pivotally connected at its respective ends to the levers 45 and 46 now in common use and forming part of the steering knuckle of the front wheels.

The construction just described acts to prevent shimmying of the steering wheels and also prevent road shock from being transmitted to the steering column 30. It will be noted that the tie rod 44 assists the equalizing plate and steering arms 45 and 46 when the steering column 30 is being used to shift the position of the steering wheels, whereby an efficient action is secured in steering without the objection of shimmying or unnecessary lost motion.

In Figs. 6 and 7 a slightly modified form of the invention is shown wherein the parts are in effect the reverse to that shown in Figs. 1 and 3. As illustrated in these figures there is provided a bracket 47 which is secured by U-bolts or otherwise to the front axle of the automobile. An equalizing bar 48 at its center is pivoted adjacent the upper end of bracket 47 and to the respective ends of this bar is pivotally connected rods 19" and 20". These rods are also connected through ball-and-socket joints 49 and 50 to brackets 51 and 52 depending from the chassis 1. It will therefore be seen that the equalizing bar 48 in this form of the invention is pivotally mounted on the axle while in the form shown in Fig. 3 it is pivotally mounted on the U-shaped member 16 depending from the chassis 1. At the rear of the chassis as shown in Fig. 6, the same structure is provided except that instead of having a bracket 17 a lug 53 is preferably welded on to the differential housing and this lug is provided with a pin 54 on which a lever 48' is pivotally mounted. Aside from these details the rear is the same as the front and will function in the same way.

In Fig. 8 a double arrangement is shown wherein the bracket 47 has auxiliary bars 55 and 56 pivotally mounted at the outer end of the main bars 57. The various centralizing rods 58 and 59 are pivotally connected to the respective ends of the bars 55 and 56 and function in substantially the same way as the rods 19 and 20.

Figure 9:
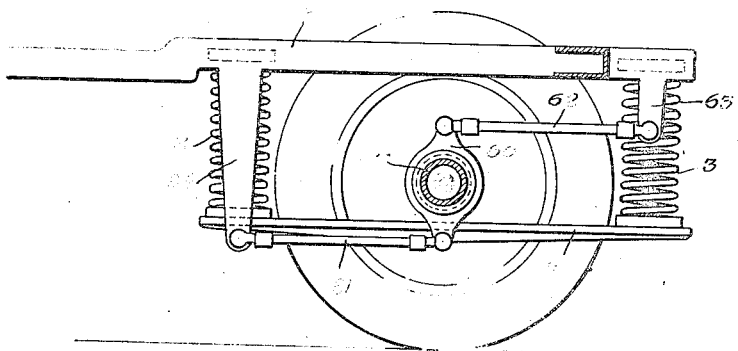
Fig. 9 is a further modified form of the invention wherein the equalizing principle of the invention is embodied in means for permitting ready up-and-down movement of the chassis but preventing any appreciable forward or rearward movement of the chassis independent of the wheels.

In Fig. 9 the inventive concept of providing centralizing mechanism which will permit an almost direct up-and-down vertical movement of the chassis is shown, arranged to limit or prevent any independent forward and rearward movement of the chassis while permitting a free up-and-down movement thereof. In this figure it will be seen that the bar 60 functions substantially similar to the bar 18 in Fig. 3 but is rotatably mounted on the rear axle frame 7. The equalizing rods 61 and 62 are connected to the respective ends of the bar 60 by suitable ball-and-socket connections and also are connected by suitable ball-and-socket connections to the brackets 63 and 64 depending from the chassis at the rear and front of the rear axle. The rods 61 and 62 extend longitudinally of the chassis, while in the form shown in Fig. 3 the rods 19 and 20 extend transversely of the chassis. It will therefore be seen that the construction shown in Fig. 9 does not need the longitudinal braces 10 and 11 as illustrated in Figs. 1 and 2. However, this structure could be used in conjunction with a transverse equalized bracing structure as shown in Fig. 3.

For purpose of adjusting and setting the lining of steering wheels, means are customarily provided, such as slightly shortening or lengthening the steering tie rod by means of having a left-hand thread at one end and a right-hand thread at the opposite end, that screw into tie rod, ends having a split portion clamped with a bolt and nut for holding set the proper adjustment. Similar means may also be incorporated in the bracing members of the centralizing device for purposes of adjustment, if desired, without departing from the scope of the invention herein disclosed.

The term "axle" includes the axle housing or casing when the rear axle of the vehicle is intended.

I claim:

1. A centralizing device for a vehicle having sprung and unsprung portions including a pair of front and a pair of rear wheels for preventing any appreciable lateral movement between said portions without interfering with a free vertical movement therebetween, said centralizing device including a substantially vertically positioned equalizing bar positioned midway between the wheels of each pair of wheels on substantially a horizontal plane with the axis of said wheels, a depending member mounted on said sprung portion adjacent each end, means for pivotally mounting said bars on the respective depending members, a substantially horizontally and laterally extending radius rod pivotally connected to each end of each of said bars, a bracket carried by said unsprung portion on each side adjacent each end, and means for pivotally connecting the respective radius rods to the respective brackets, said brackets being so positioned that one will project above the axis of adjacent wheels and the other below.

2. A vehicle including a body, a pair of front wheels, a pair of rear wheels, and an axle for each pair of wheels, resilient means for supporting said body on said axles, a plurality of longitudinal radius rods connecting said body and said axles to prevent any appreciable longitudinal movement between the axles and the body, a bracket carried by said body, and a centralizing device consisting of an equalizing member pivotally mounted on said bracket, the pivot of said equalizing member being in substantially the same horizontal plane as the axis of said wheels, an upper radius rod arranged above the axis of adjacent wheels, a second radius rod arranged below the axis of adjacent wheels, means for pivotally connecting said rods to opposite points on said equalizing member above and below the pivot of said equalizing member, and means for pivotally mounting the outer ends of the respective laterally extending radius rods above and below the axis of adjacent wheels and thereby preventing any appreciable lateral movement between the axle and the body.

LOUIS J. DELLERT.